Patented Dec. 24, 1935

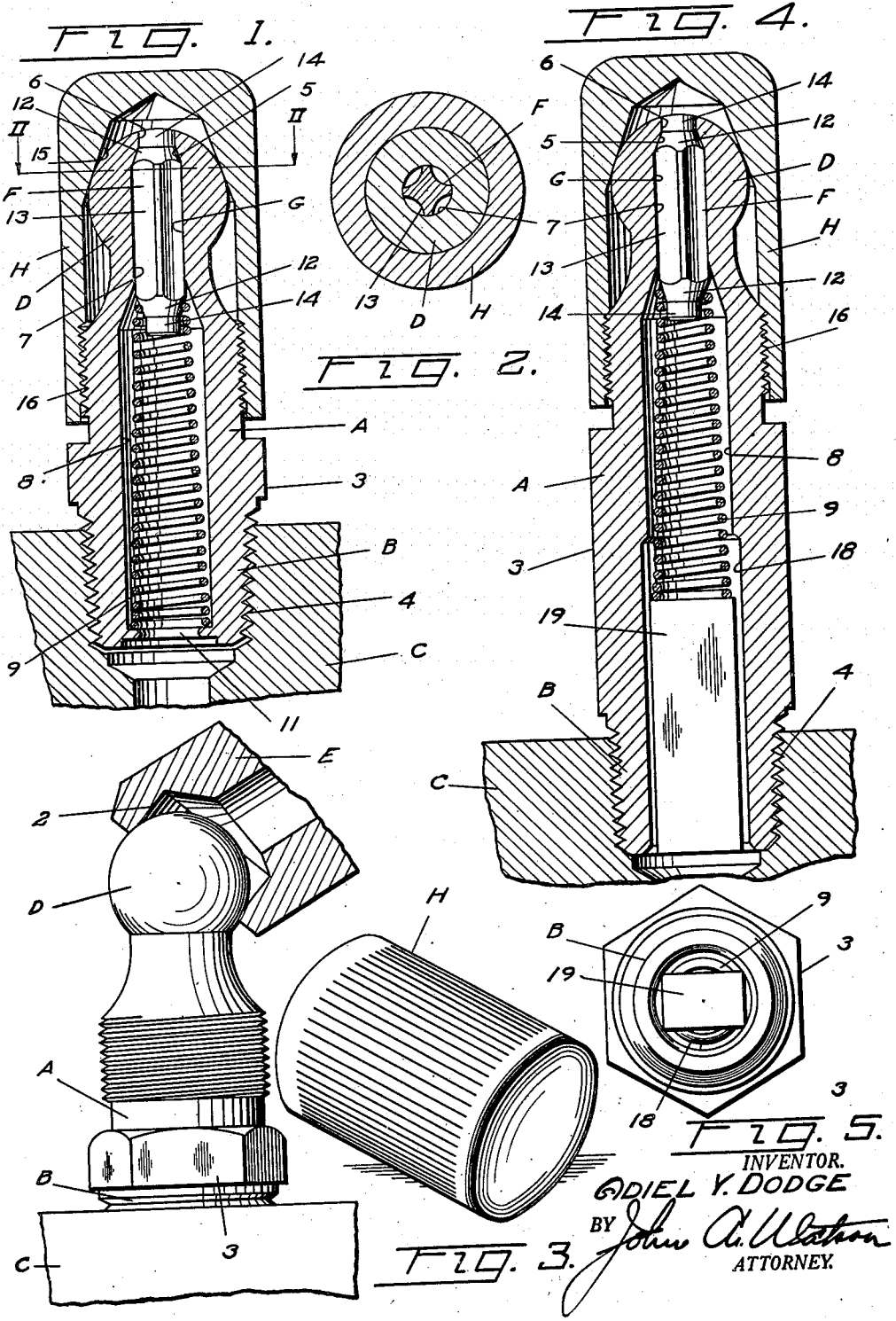

2,025,229

UNITED STATES PATENT OFFICE 2,025,229

LUBRICATING DEVICE

Adiel Y. Dodge, South Bend, Ind., assignor to The Lubrication Corporation, South Bend, Ind., a corporation of Delaware Application June 27, 1932, Serial No. 619,499

5 Claims. (Cl. 184—105)

This invention relates to improvements in lubricating devices and more particularly to improvements in lubricant and other fluid or semi-fluid receiving fittings.

An object of the invention is to provide a lubricant or fluid receiving fitting of the type through which lubricants or fluids may be fed from a dispensing nozzle into a bearing or other receiving member, incorporating closure means for the fitting to render it air tight.

A further object is to provide a lubricant or fluid receiving fitting as described having a closure cap adapted to provide an air tight seal over the fitting head regardless of slight angular error in the disposition of the cap over the fitting head through variation in the construction of the cap securing means.

A still further object is to provide a fitting of the character described having relatively few parts, and which is capable of high speed production with accuracy.

Other objects, the advantages and uses of the invention will be, or should become apparent after reading the following description and claims and after consideration of the accompanying drawing forming a part of this specification, in which:

Fig. 1 is a sectional view of a fitting incorporating the features of the invention;

Fig. 2 is a sectional view along the line II—II of Fig. 1;

Fig. 3 is a view in perspective of the fitting during engagement with a discharge nozzle;

Fig. 4 is a sectional view of another form of the fitting; and

Fig. 5 is a bottom plan view of the fitting illustrated in Fig. 4.

In general, the lubricant or fluid receiving fittings selected for illustration herein comprise, a body A having a threaded shank B for securing the fitting within an internally threaded bore or recess in a receiving member C, a spherical head D adapted to be engaged through a wide angular range by a dispensing nozzle E, a valve F within the fluid passageway 6 of the fitting and a screw threaded closure cap H, the inner walls of which are adapted to cooperate with the spherical surface of the head D to form an air tight seal over the fitting head.

Referring to the fitting of Figs. 1 to 3, the fitting illustrated therein is particularly adapted for use on air brake cylinders for conducting lubricant into the cylinder and for preventing the escape of air therethrough from the cylinder or for use on the water pump of an engine.

The body A together with the threaded shank B and the head D may be integrally formed of cold rolled steel and subsequently heat treated to obtain the desirable degree of hardness to resist wear upon the spherical walls of the head encountered through metal to metal contact between the head and the walls of the discharge orifice 2 of the dispensing nozzle E as during a lubricant servicing operation. A portion 3 of the body A may be formed with hexagonal side walls to adapt the fitting to the jaws of a wrench for turning the threaded shank B into a threaded bore or passage 4 formed in the receiving member C. The lubricant conducting passageway G is formed to provide a conical walled valve seat 5 located between a short cylindrical walled portion 6, forming the inlet port of the fitting disposed centrally of the head D and a cylindrical walled portion 7 of greater internal diameter than the portion 6 extending downwardly of the seat 5 for a considerable distance where it joins a portion 8 of still greater internal diameter. A compression spring 9 is housed within the portion 8 of the passageway G for urging the valve member F upwardly against its seat 5. The lower end of the spring 9 may be supported upon an inwardly swaged portion 11 of the passage wall formed subsequent to the assembly of the valve and spring within the passageway G.

The valve member F may be formed with two conical walled seat engaging portions 12, one adjacent each end, thereby facilitating speed in assembly of the fitting as well as permitting the reversal of the valve member when wear occurs thus prolonging the useful life of the fitting. The body of the valve member F between the conical walled portions 12 is of such a diameter as to slidably engage with the cylindrical portion 7 of the passageway G and has a plurality of longitudinal flutes 13 formed in its side walls at equal distances apart about the circumference of the member to provide clearance between the valve member and the passage wall 7 through which lubricant may flow subsequent to the opening of the valve against the force of the spring 9 when introduced to the fitting passageway G through the inlet port 6. The outer end portions 14 of the valve member F are cylindrical and of a diameter slightly less than the diameter of the portion 6 of the passageway G and formed with a spherical end wall to conform with and lie contiguous with the surface of the head D when the valve is closed. In manufacturing the fitting it is important that the axis of the passage wall 7 coincide with the axis of the valve seat 5. This arrangement provides uniform engagement between the valve member F and the valve seat regardless of the rotary movement of the valve and because the valve F may not tilt with respect to the axis of the valve seat assures a proper lapping of the valve through use or by fluttering the valve by air admitted through the port 6 at a predetermined pressure. A valve so constructed may be made to provide an efficient air tight seal that is not likely to become impaired through continued use.

In addition to the air tight seal afforded by the valve F the inner wall of the closure cap H is formed with a conical portion 15 adapted to be drawn into engagement tightly with the spherical surface of the head D to form an air tight seal by ring contact between the adjacent contacting surfaces under thrust provided by cooperating screw threads 16 formed on the body A and inner wall of the cap. The method in which this seal is established is substantially the same as that of providing the seal by contact between the dispensing nozzle E and the fitting head D as shown in Fig. 3. It will be apparent therefore that slight error in the disposition of the threads upon either the cap H or body A or warpage of the fitting body may not destroy the sealing characteristics of the cap as this feature depends entirely upon the drawing of the surface 15 inwardly upon the fitting head regardless of the angularity of the cap relative to the axis of the fitting head.

In Figs. 4 and 5, a modified form of the fitting is shown which is similar in most respects to the fitting heretofore described and wherein like reference numerals have been employed to designate like parts. The principal difference lies in elongating the body A to locate the head D away from the receiving member C. The lower end 18 of the passageway G is of enlarged diameter and has an elongated spring retainer block 19 driven therein to form a support for the lower end of the spring 9. The block 19 may be rectangular in cross section so as to provide ample clearance between the block and the walls of the portion 18 of the passageway for lubricant or other fluid admitted to the port 6 to pass. This arrangement permits the use of the same length and style of spring as employed in the fitting of Figs. 1 to 3 and therefore a saving in manufacturing costs.

It is to be understood that the described embodiments of the invention herein set forth are presented for the purpose of illustration only, and various changes may be made therein without departing from the spirit and scope of the invention.

I claim:

1. A fitting for receiving lubricants and other fluids comprising, a body formed with a spherical head, said body having a passageway extending therethrough terminating in said head and a closure cap adapted to be placed over said head, said cap having an inclined inner side wall adapted to engage with the surface of said head to form a ring seal therebetween.

2. A fitting for receiving lubricants and other fluids comprising, a body formed with a spherical head, said body having a passageway extending therethrough terminating in said head, a closure cap adapted to be placed over said head, said cap having an inclined inner side wall adapted to engage with the surface of said head to form a ring seal therebetween, and means for drawing said cap into engagement tightly with said fitting head.

3. A fitting for receiving lubricants and other fluids comprising, a body having a shank at one end for attachment to a receiving member and a head at its outer end adapted to be engaged by a dispensing nozzle, a closure cap for said fitting adapted to fit over said head, said head and said cap having cooperating surfaces arranged to contact with one another to form a ring seal therebetween, one of said surfaces being uniformly curved in vertical cross-section and the other of said surfaces being conical in contour and means for drawing said cap into engagement tightly with said fitting head.

4. A lubricant receiving fitting comprising, a body formed with a spherical head at the outer end thereof, said body having a lubricant conducting passageway extending therethrough terminating in said head, and having screw-threads upon the outer wall thereof below said head, and a closure cap adapted to be placed over said head, said cap having a conical inner side wall adapted to engage with the surface of said spherical head to form a ring seal therebetween, and having screw-threads formed at the outer end of the cap for engagement with the screw threads on said fitting body to draw the cap into close engagement with the fitting head, the wall of said cap between the conical walled portion and the threaded portion being relatively thin.

5. A fitting for receiving lubricants and other fluids comprising, a body formed with a head, said head having a passageway extending therethrough terminating at the surface of said head, a closure cap adapted to be placed over said head, the inner wall of said cap and the outer surface of said head having cooperative portions fashioned to provide an annular line sealing contact therebetween when the cap is drawn into engagement with the head, one of said cooperative surface portions being curved in vertical cross-section and the other of said surface portions being conical in contour, and means for drawing the cap into engagement tightly with said head.

ADIEL Y. DODGE.